United States Patent
Schumacher et al.

(10) Patent No.: US 7,351,388 B2
(45) Date of Patent: Apr. 1, 2008

(54) PYROGENICALLY PRODUCED SILICON DIOXIDE POWDER

(75) Inventors: Kai Schumacher, Hofheim (DE);
Naruyasu Ishibashi, Yokkaichi (JP);
Hitoshi Kobayashi, Yokkaichi (JP);
Paul Brandl, Yokkaichi (JP)

(73) Assignee: Degussa AG, Duesseldorf (DE)

( * ) Notice: Subject to any disclaimer, the term of this patent is extended or adjusted under 35 U.S.C. 154(b) by 341 days.

(21) Appl. No.: 11/085,151

(22) Filed: Mar. 22, 2005

(65) Prior Publication Data
US 2006/0153764 A1   Jul. 13, 2006

(30) Foreign Application Priority Data
Jan. 12, 2005  (DE) .................... 10 2005 001 414

(51) Int. Cl.
*C01B 33/12*  (2006.01)
(52) U.S. Cl. ................. 423/337; 106/287.34; 423/335; 502/240
(58) Field of Classification Search ................. 423/335, 423/337
See application file for complete search history.

(56) References Cited

U.S. PATENT DOCUMENTS

| | | | |
|---|---|---|---|
| 4,067,954 A * | 1/1978 | Volling ........................ 423/336 |
| 5,340,560 A * | 8/1994 | Rohr et al. ................... 423/337 |
| 5,855,860 A * | 1/1999 | Nishimine et al. ........... 423/337 |
| 6,328,944 B1 * | 12/2001 | Mangold et al. ............. 423/278 |
| 6,551,567 B2 * | 4/2003 | Konya et al. ................ 423/337 |
| 6,800,413 B2 * | 10/2004 | Barthel et al. ............. 430/108.3 |
| 2001/0033818 A1 * | 10/2001 | Nozawa et al. .............. 423/337 |
| 2002/0102199 A1 * | 8/2002 | Nishimine et al. ........... 423/337 |
| 2004/0253164 A1 * | 12/2004 | Mangold et al. ............. 423/335 |
| 2005/0129603 A1 * | 6/2005 | Szillat et al. ................ 423/335 |

OTHER PUBLICATIONS

U.S. Appl. No. 11/055,605, filed Feb. 11, 2005, Schumacher et al.
U.S. Appl. No. 10/524,037, filed Feb. 9, 2005, Schumacher et al.
U.S. Appl. No. 11/085,151, filed Mar. 22, 2005, Schumacher et al.
U.S. Appl. No. 10/863,348, filed Jun. 9, 2004, Mangold et al.
U.S. Appl. No. 11/084,022, filed Mar. 21, 2005, Schumacher et al.
U.S. Appl. No. 11/084,170, filed Mar. 21, 2005, Schumacher et al.
U.S. Appl. No. 11/085,151, filed Mar. 22, 2005, Schumacher et al.
U.S. Appl. No. 10/530,284, filed Apr. 5, 2005, Moerters et al.
U.S. Appl. No. 10/530,491, filed Apr. 6, 2005, Moerters et al.
U.S. Appl. No. 10/549,929, filed Sep. 20, 2005, Schumacher et al.

* cited by examiner

*Primary Examiner*—Wayne A. Langel
(74) *Attorney, Agent, or Firm*—Oblon, Spivak, McClelland, Maier & Neustadt, P.C.

(57) ABSTRACT

Pyrogenically produced silicon dioxide powder in the form of aggregates of primary particles having a BET surface area of $300\pm25$ m$^2$/g, wherein the aggregates display an average surface area of 4800 to 6000 nm$^2$, an average equivalent circle diameter (ECD) of 60 to 80 nm and an average circumference of 580 to 750 nm.

It is produced by a pyrogenic process in which silicon tetrachloride and a maximum of up to 40 wt. % of a second silicon component comprising $H_3SiCl$, $H_2SiCl_2$, $HSiCl_3$, $CH_3SiCl_3$, $(CH_3)_2SiCl_2$, $(CH_3)_3SiCl$ and/or $(n-C_3H_7)SiCl_3$ are mixed with primary air and a combustion gas and burnt into a reaction chamber, secondary air also being introduced into the reaction chamber, and the feed materials being chosen such that an adiabatic flame temperature of 1390 to 1450° C. is obtained.

It can be used as a filler.

3 Claims, No Drawings

PYROGENICALLY PRODUCED SILICON DIOXIDE POWDER

The invention concerns a pyrogenically produced silicon dioxide powder, its production and use.

Flame hydrolysis for the production of silicon dioxide is a process that has long been known and is performed on an industrial scale. In this process an evaporated or gaseous hydrolysable silicon halide is mixed with a flame formed by burning a water-forming, hydrogen-containing fuel and an oxygen-containing gas. The combustion flame provides water for hydrolysis of the silicon halide and sufficient heat for the hydrolysis reaction. The silicon dioxide powder carried in the residual reaction gases is subjected to conventional cooling and solids separation processes. Silicon tetrachloride is usually used. The use of dichlorosilane, trichlorosilane is also known, however. If carbon-containing feed materials are used, such as e.g. methyl trichlorosilane, dimethyl dichlorosilane, methyl dichlorosilane, dibutyl dichlorosilane, ethyl trichlorosilane, propyl trichlorosilane, an oxidation process to convert the carbon into carbon dioxide also takes place.

As a consequence, a silicon dioxide powder which is formed in a process wherein both reaction types, namely flame hydrolysis and oxidation, take place is described as a pyrogenically produced silicon dioxide.

In the reaction, highly dispersed, non-porous primary particles are initially formed, which as the reaction continues coalesce to form aggregates which in turn can congregate to form agglomerates. The BET surface area of these primary particles is generally between 5 and 600 m²/g. The powder displays free hydroxyl groups on its surface.

The silicon dioxide powder produced in this way is used in many areas of application. In many applications, the time needed for incorporation into liquid media is a substantial cost factor. It has been found that for silicon dioxide powders produced by the prior art, even though they were produced by the same type of reaction and also display parameters that are identical or similar to the parameters that are conventionally cited for characterisation, such as the BET surface area for example, very long times are needed for incorporation into liquid media.

The object of the invention is therefore to provide a silicon dioxide powder than can be incorporated quickly into liquid media.

A further object of the invention is to provide a process for the production of this powder.

The invention provides a pyrogenically produced silicon dioxide powder in the form of aggregates of primary particles having a BET surface area of 300±25 m²/g, wherein the aggregates display an average surface area of 4800 to 6000 nm²,
an average equivalent circle diameter (ECD) of 60 to 80 nm and
an average circumference of 580 to 750 nm.

The BET surface area is determined here in accordance with DIN 66131.

The aggregate sizes are determined by image analysis using an H 7500 TEM device supplied by Hitachi and a MegaView II CCD camera supplied by SIS. The image magnification for analysis is 30000:1 with a pixel density of 3.2 nm. The number of particles analyzed is greater than 1000. Preparation takes place in accordance with ASTM 3849-89. The lower threshold limit in terms of detection is 50 pixels.

The BET surface area can preferably be 300±15 m²/g and particularly preferably 300±10 m²/g.

Furthermore, a pyrogenically produced silicon dioxide powder according to the invention can be preferred in which the aggregates display an average surface area of 5000 to 5700 nm²,
an average equivalent circle diameter of 65 to 75 nm and
an average circumference of 600 to 720 nm.

Furthermore, a pyrogenically produced silicon dioxide powder according to the invention can be preferred in which the maximum aggregate diameter is between 100 and 140 nm and the minimum aggregate diameter is between 60 and 90 nm.

Furthermore, a pyrogenically produced silicon dioxide powder according to the invention can be preferred in which the chloride content is less than 250 ppm. A chloride content of less than 150 ppm is particularly preferred.

Furthermore, a pyrogenically produced silicon dioxide powder according to the invention can be preferred in which the carbon content is less than 500 ppm. A carbon content of less than 300 ppm is particularly preferred.

The invention also provides a process for the production of the silicon dioxide powder according to the invention wherein a mixture of silicon compounds is evaporated, separately or together, the vapors are transferred by means of a carrier gas to a mixing chamber, with
$SiCl_4$ as the first component in a proportion of 60 to 100 wt. % relative to the mixture, and
a second component chosen from the group comprising $H_3SiCl$, $H_2SiCl_2$, $HSiCl_3$, $CH_3SiCl_3$, $(CH_3)_2SiCl_2$, $(CH_3)_3SiCl$, $(n-C_3H_7)SiCl_3$, in a proportion of 0 to 40 wt. %, preferably 5 to 30 wt. %, relative to the mixture, and a combustion gas and primary air, which can optionally be enriched with oxygen and/or be preheated, are transferred separately to the mixing chamber,
the mixture comprising the vapor of silicon compounds, combustion gas and primary air is ignited in a burner and the flame burns into a reaction chamber,
secondary air, which surrounds the flame, is introduced into the reaction chamber, the ratio of secondary air to primary air being in a range from 0.05 to 4, preferably 0.15 to 3,
the solid is then separated from gaseous substances and the solid is then steam-treated, wherein
the total amount of oxygen is at least sufficient for the complete combustion of the combustion gas and the silicon compounds and
the amount of feed materials consisting of silicon compounds, combustion gas, primary air and secondary air is chosen such that an adiabatic flame temperature $T_{ad}$ of 1390 to 1450° C. is obtained, where $T_{ad}$=the temperature of the feed materials+the sum of the reaction enthalpies of the partial reactions/heat capacity of the substances leaving the reaction chamber, comprising silicon dioxide, water, hydrogen chloride, carbon dioxide, oxygen, nitrogen, and optionally the carrier gas if it is not air or nitrogen, taking the specific heat capacity of these substances at 1000° C. as a basis.

The reaction of the silicon compounds in the presence of oxygen and a combustion gas yields silicon dioxide, water, hydrochloric acid and, in the case of carbon-containing silicon compounds and/or carbon-containing combustion gases, carbon dioxide. The reaction enthalpies of these reactions can be calculated by means of standard works known to the person skilled in the art.

Table 1 shows selected reaction enthalpy values for the reaction of silicon compounds in the presence of hydrogen and oxygen.

Methyl trichlorosilane (MTCS, $CH_3SiCl_3$), trichlorosilane (TCS, $SiHCl_3$) and/or dichlorosilane (DCS, $SiH_2Cl_2$) can particularly preferably be used.

TABLE 1

Reaction enthalpies

| | KJ/mol |
|---|---|
| $H_2$ | −241.8 |
| $SiCl_4$ | −620.1 |
| $SiHCl_3$ | −659.4 |
| $SiH_2Cl_2$ | −712.3 |
| $C_3H_7SiCl_3$ | −2700.2 |
| $CH_3SiCl_3$ | −928.3 |
| $(CH_3)_3SiCl$ | −2733.8 |

Suitable combustion gases are hydrogen, methane, ethane, propane and/or natural gas, with hydrogen being preferred.

There is no restriction on the temperature of the feed materials, provided that it is above the boiling point of the highest boiling silicon compound. A temperature of the feed materials of 90° C.±40° C. has proved to be advantageous.

It can also be advantageous if the discharge velocity of the reaction mixture from the mixing chamber into the reaction chamber is 10 to 80 m/s.

The invention also provides the use of the pyrogenically produced silicon dioxide powder according to the invention as a filler in rubber, silicone rubber and plastics, to adjust the rheology in paints and coatings, as a polyester, as a support for catalysts and to produce dispersions.

EXAMPLES

The BET surface area is determined in accordance with DIN 66131.

Determining the Incorporation Time in Water 10 g of silicon dioxide powder are placed in a 500 ml vessel having a diameter of 80 mm. 50 g of aqueous nitric acid (pH 3.90) are added whilst stirring with a high-speed mixer fitted with a 70 mm disc at 500 rpm, and the time needed to wet the powder is measured. The incorporation time for Aerosil® 300, Degussa, is used as a comparison and is standardised to 100.

Determining the Viscosity in Polyvinyl Alcohol 60 g of an aqueous five-percent polyvinyl alcohol solution and 80 g of demineralised water are placed in a 500 ml vessel having a diameter of 80 mm. 10 g of silicon dioxide powder are added to this solution and the mixture is then dispersed for five minutes in a high-speed mixer fitted with a 50 mm disc at 2500 rpm. The viscosity of the mixture is then determined using a Haake rheometer at 2.7 $s^{-1}$ and 23° C. The viscosity of Aerosil® 300, Degussa, is used as a comparison and is standardised to 100.

Example 1

Production of a Silicon Dioxide Powder 180 kg/h of silicon tetrachloride are evaporated and transferred to the mixing chamber of a burner by means of nitrogen. At the same time, 58 $Nm^3/h$ of hydrogen and 190 $Nm^3/h$ of primary air are introduced into the mixing chamber. The mixture displays a temperature of 90° C. It is ignited and burnt into a reaction chamber in a flame. The discharge velocity from the burner is 30.3 m/s. In addition, 60 $Nm^3/h$ of secondary air, which surrounds the flame, are introduced into the reaction chamber. The ratio of secondary air to primary air is 0.32.

The reaction gases and the silicon dioxide that is formed are drawn through a cooling system by application of a partial vacuum, cooling them to values between 100 and 160° C. The solid is separated from the waste gas stream in a filter or cyclone and then steam-treated at a temperature of 560° C.

Examples 2 to 9 are performed in the same way.

Table 2 reproduces the feed materials and the amounts from Examples 1 to 9.

Table 3 reproduces the reaction enthalpies, heat capacity values and adiabatic flame temperatures from Examples 1 to 9.

Examples 1 to 5 produce powders according to the invention. Examples 6 to 9 are comparative examples.

Two silicon components are used in Examples 2 and 4, three in Example 3.

In Examples 1 and 3, high and low proportions of the first silicon component, silicon tetrachloride, are used respectively.

In Example 5 a high ratio of secondary air to primary air within the claimed range is established.

In Examples 6 and 7 settings are chosen which lead to an adiabatic flame temperature outside the claimed range.

In Example 8 no secondary air is introduced.

In Example 9 the ratio of secondary air to primary air is outside the claimed range.

Table 4 shows analytical data for the silicon dioxide powders produced, and for a commercially available pyrogenically produced silicon dioxide powder (Example 10).

Examples 1 to 5 show how a specific narrow adiabatic flame temperature range can be obtained by varying the amounts of feed materials.

Comparative examples 6 and 7 also show that with the same composition of silicon compounds as in Example 1, silicon dioxide powders according to the invention are not obtained. The powders obtained display BET surface areas outside the claimed range, Example 6: 266 $m^2/g$ and Example 7: 394 $m^2/g$. In comparative examples 6 and 7, the adiabatic flame temperatures are outside the claimed range.

In comparative examples 8 and 9, the adiabatic flame temperatures are within the claimed range, but silicon dioxide powders according to the invention are not obtained:

In Example 8 no secondary air is added. The powder obtained has a long incorporation time (151%).

In Example 9 the ratio of secondary air to primary air of 4.2 is outside the claimed range. The silicon dioxide powder obtained displays a very high relative viscosity of 165%.

The powder from Example 1 is a commercially available powder, Aerosil® 300 from Degussa. Although this powder displays a BET surface area that is within the claimed range, it has a markedly higher viscosity and a markedly longer incorporation time than the powders according to the invention. In order to compare the values for the relative viscosity and the incorporation time, powder 10 is standardised to 100%. The average aggregate surface area, average equivalent circle diameter and average aggregate circumference are outside the claimed ranges.

TABLE 2

Feed materials and amounts used

| | | According to the invention Example | | | | | | Comparison | | |
|---|---|---|---|---|---|---|---|---|---|---|
| | | 1 | 2 | 3 | 4 | 5 | 6 | 7 | 8 | 9 |
| Silicon tetrachloride | kg/h | 180 | 160 | 150 | 115 | 6.5 | 180 | 6.5 | 150 | 6.5 |
| 2nd silicon component[$] | kg/h | 0 | MTCS 20 | MTCS 20 | MTCS 65 | 0 | 0 | 0 | MTCS 20 | 0 |
| 3rd silicon component[$] | kg/h | 0 | 0 | PTS 10 | 0 | 0 | 0 | 0 | PTS 10 | 0 |
| Hydrogen | Nm³/h | 58 | 53 | 47 | 40 | 2.3 | 58 | 2.3 | 47 | 2.3 |
| Primary air | Nm³/h | 190 | 215 | 250 | 260 | 4.0 | 160 | 8 | 315 | 5.0 |
| Secondary air | Nm³/h | 60 | 60 | 65 | 65 | 6 | 60 | 6 | 0 | 21.0 |
| Inlet temperature(*) | °C. | 90 | 90 | 90 | 90 | 90 | 90 | 90 | 90 | 90 |
| Secondary air/ primary air | | 0.32 | 0.28 | 0.26 | 0.25 | 1.5 | 0.32 | 0.75 | 0 | 4.2 |
| $V_{burner}$[+] | m/s | 30.3 | 33.6 | 35.9 | 36.3 | 25.3 | 26.9 | 37.3 | 43.6 | 28.9 |

(*)For mixture of $H_2$, primary air, $SiCl_4$, 2nd and optionally 3rd silicon component
[$]MTCS = methyl trichlorosilane; TCS = trichlorosilane; DCS = dichlorodisilane, PTS = propyl trichlorosilane;
[+] = discharge velocity from burner

TABLE 3

Reaction enthalpy, heat capacity and adiabatic flame temperature

| | | According to the invention Example | | | | | | Comparison | | |
|---|---|---|---|---|---|---|---|---|---|---|
| | | 1 | 2 | 3 | 4 | 5 | 6 | 7 | 8 | 9 |
| Sum of reaction enthalpies from partial reactions | KW | −214.2 | −229.2 | −251.3 | −257.9 | −8.4 | −214.2 | −8.4 | −251.3 | −8.4 |
| Heat capacity of products | KJ/s·K | 0.16 | 0.17 | 0.19 | 0.19 | 0.01 | 0.15 | 0.01 | 0.19 | 0.01 |
| Adiabatic flame temperature | °C. | 1424 | 1427 | 1425 | 1427 | 1402 | 1536 | 1132 | 1440 | 712 |

TABLE 4

Analytical data for silicon dioxide powders

| | | According to the invention Example | | | | | Comparison |
|---|---|---|---|---|---|---|---|
| | | 1 | 2 | 3 | 4 | 5 | 10(*) |
| BET surface area | m²/g | 298 | 302 | 310 | 307 | 293 | 301 |
| Average aggregate surface area | nm² | 5082 | 5293 | 5661 | 5081 | 5876 | 8087 |
| Average equivalent circle diameter | nm | 66 | 71 | 72 | 65 | 75 | 85 |
| Average aggregate circumference | nm | 623 | 686 | 634 | 624 | 727 | 888 |
| Average maximum aggregate diameter | nm | 121 | 130 | 129 | 121 | 138 | 155 |
| Average minimum aggregate diameter | nm | 74 | 80 | 81 | 75 | 85 | 96 |
| Average primary particle diameter | nm | 10 | 9.6 | 11 | 10 | 10 | 11 |
| C content | ppm | <10 | <10 | 20 | 260 | <10 | 100 |
| Cl content | ppm | 100 | 20 | 40 | 90 | 150 | 30 |
| Relative viscosity at 2.7 s⁻¹ | % | 72 | 69 | 73 | 70 | 89 | 100 |
| Relative incorporation time | % | 61 | 64 | 65 | 63 | 71 | 100 |

(*)Aerosil ® 300, Degussa AG.

The invention claimed is:

1. A process for the production of a silicon dioxide powder,
wherein
a mixture of silicon compounds is evaporated, separately or together, the vapours are transferred with a carrier gas to a mixing chamber, with
$SiCl_4$ as a first silicon compound in a proportion of 60 to 100 wt. % relative to the mixture, and
a second silicon compound selected from the group consisting of $H_3SiCl$, $H_2SiCl_2$, $HSiCl_3$, $CH_3SiCl_3$, $(CH_3)_2SiCl_2$, $(CH_3)_3SiCl$, $(n-C_3H_7)SiCl_3$, and a mixture thereof, in a proportion of 0 to 40 wt. %, relative to the mixture,
and a combustion gas and primary air, which can optionally be enriched with oxygen and/or be preheated, are transferred separately to the mixing chamber,
the mixture comprising the vapour of the silicon compounds, the combustion gas and the primary air is ignited in a burner and the flame burns into a reaction chamber,
secondary air, which surrounds the flame, is introduced into the reaction chamber, the ratio of the secondary air to the primary air being in a range from 0.05 to 4,
a resultant solid is then separated from gaseous substances and the solid is then steam-treated, thereby producing the silicon dioxide powder,
wherein
the total amount of oxygen is at least sufficient for the complete combustion of the combustion gas and the silicon compounds and
the amount of feed materials consisting of the silicon compounds, the combustion gas, the primary air and the secondary air is chosen such that an adiabatic flame temperature $T_{ad}$ of 1390 to 1450° C. is obtained, where
$T_{ad}$= the temperature of the feed materials + the sum of the reaction enthalpies of partial reactions/heat capacity of the substances leaving the reaction chamber, comprising silicon dioxide, water, hydrogen chloride, carbon dioxide, oxygen, nitrogen, and optionally a carrier gas if it is not air or nitrogen,
taking the specific heat capacity of these substances at 1000° C. as a basis,
wherein the produced silicon dioxide powder is in the form of aggregates of primary particles having a BET surface area of 300±25 $m^2/g$,
wherein
the aggregates display
an average surface area of 4800 to 6000 $nm^2$,
an average equivalent circle diameter (ECD) of 60 to 80 nm and
an average circumference of from 600 to 750 nm.

2. The process according to claim 1,
wherein
the temperature of the feed materials is 90° C.±40° C.

3. The process according to claim 1,
wherein
the discharge velocity of the reaction mixture from the mixing chamber to the reaction space is 10 to 80 m/s.

* * * * *